United States Patent [19]

Nieuwkoop

[11] Patent Number: 4,864,292
[45] Date of Patent: Sep. 5, 1989

[54] IDENTIFICATION SYSTEM

[75] Inventor: Evert Nieuwkoop, Pijnacker, Netherlands

[73] Assignee: Nederlandse Organisatie voor Toegepast-Natuurwetenschappelijk Onderzoek TNO, Netherlands

[21] Appl. No.: 224,876

[22] PCT Filed: Nov. 12, 1987

[86] PCT No.: PCT/NL87/00033
 § 371 Date: Jun. 28, 1988
 § 102(e) Date: Jun. 28, 1988

[87] PCT Pub. No.: WO88/03594
 PCT Pub. Date: May 19, 1988

[30] Foreign Application Priority Data
 Nov. 14, 1986 [GB] United Kingdom ............... 8627241

[51] Int. Cl.$^4$ .................. H04Q 9/00; E05B 49/00
[52] U.S. Cl. ...................... 340/825.31; 340/825.340; 340/825.540; 361/172; 235/439
[58] Field of Search ............ 340/825.31, 825.54, 340/825.34, 825.32, 825.3, 825.06, 825.07, 505, 310 R, 572, 310 A, 541, 542, 825.98; 235/380-382, 435, 439, 449, 451; 342/44, 50, 51; 70/271, 277, 278, 382; 361/171, 172

[56] References Cited
U.S. PATENT DOCUMENTS

| 3,440,633 | 4/1969 | Vinding | 340/825.54 |
| 3,696,383 | 10/1972 | Oishi et al. | 340/310 R |
| 4,371,867 | 2/1983 | Gander | 340/310 R |
| 4,388,524 | 6/1983 | Walton | 340/825.31 |
| 4,549,176 | 10/1985 | Kreft | 340/825.31 |
| 4,580,041 | 4/1986 | Walton | 235/380 |

Primary Examiner—Donald J. Yusko
Assistant Examiner—E. O. Pudpud
Attorney, Agent, or Firm—Larson & Taylor

[57] ABSTRACT

An identification system, consisting of at least one stationary element and at least one movable element or token, the first element having a first induction coil adapted to generate a magnetic alternating field and being connected to a source of alternating current, and to a detector for detecting variations of the electromagnetic field, the detector being adapted to compare the detected patterns, the second element having a second induction coil adapted to pick up the field of the first coil and being connected to a rectifier circuit adapted to rectify the induction voltage of the second coil, a capacitive storage device being provided for smoothing the rectified voltage, a control circuit being fed by the rectified voltage and receiving, at an input terminal, the ac voltage induced in the second coil, the control circuit having an encoding deive adapted to produce, at an output terminal, code signals identifying the second element, these code signals being used for actuating a switch which, in one condition, short-circuits the second coil. This system is characterized in that the capacitive storage device is of a small capacity, in particular an integrated or intrinsic capacity of the circuit of each second element, in that the rectifier is a full-wave pg,2 rectifier bridge, two opposite corners thereof being connected to the respective ends of the second coil and one thereof also being connected to the signal input terminal of the control circuit, and in that the switch means is adapted to short-circuit one arm of the bridge which is connected to that end of the second coil which is not connected to the signal input terminal of the control circuit.

9 Claims, 6 Drawing Sheets

IDENTIFICATION SYSTEM

BACKGROUND

The present invention relates generally to the field of electronic locking or access-control systems where a user wishing to gain access to a restricted area, or to some service such as the use of a cash-dispensing machine, presents to a receiving apparatus a token which transmits identification data indicative of the user's authority to gain such access. More particularly, the invention relates to a contactless-identification system of the kind where the receiving apparatus includes an alternating magnetic field generator and the token includes a transponder powered by induction from said field.

SUMMARY

As essential component of the transponder in a system of the kind indicated above is a coil or antenna through which the power for operation is induced and through which the identification data is transmitted. In prior art locking system in which this principle of operation has been used at least the antenna (and possibly other components, in particular capacitors) is manufactured and assembled as a discrete component separate from the rest of the transponder circuit, to which it must be electrically connected when assembled to the token. The present invention, on the other hand, proposes in one broad aspect a token for use in an electronic locking or access-control system of the kind indicated above of which the transponder is manufactured as a complete integrated circuit including the antenna. By eliminating the need to make connections between at least a separate antenna and other parts of the transponder circuit the reliability and manufacturing cost of a token in accordance with the invention should be respectively increased and decreased in comparison with those used in prior art systems.

BRIEF DESCRIPTION OF DRAWINGS

This and other features of the present invention will now be more particularly described, by way of example, with reference to the accompanying drawings, in which.

DETAILED DESCRIPTION OF DRAWINGS

Figure 1:
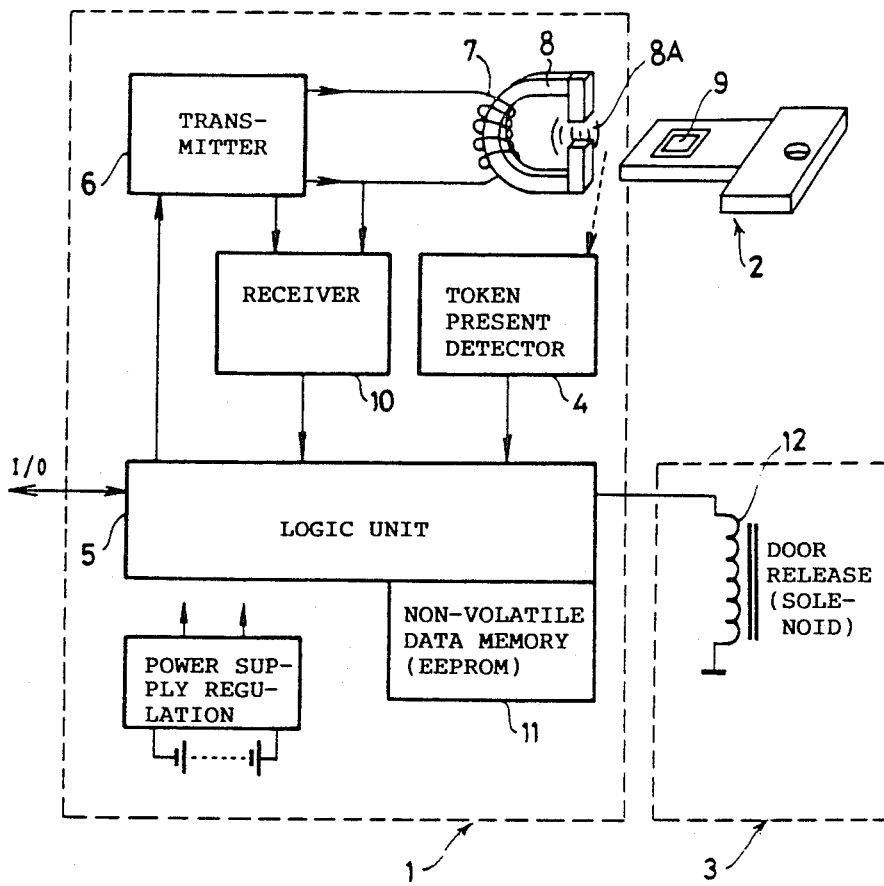
FIG. 1 is a schematic block diagram of a system operating in accordance with the invention as applied to physical access-control.

Referring to FIG. 1, the illustrated access-control system comprises a receiving apparatus 1 to which users present an individual identification token 2 when entry through a normally-locked door 3 is required. When a token is presented to the apparatus its presence is sensed by a detector 4 which instructs the central logic unit 5 to activate a transmitter 6. The latter energises the primary coil 7 of an alternating magnetic field generator comprising a ferromagnetic core 8 which forms a magnetic loop with a small gap 8A. When the token 2 is presented to the apparatus an integrated circuit transponder 9 carried by it is placed within the gap 8A and is subjected to the alternating field concentrated by the core 8. As more particularly described below the transponder is thus caused to transmit identification data which modulates the magnetic field in the core 8 in amplitude or frequency, or adds a magnetic field with a different frequency, and can be detected by a receiver 10 associated with the transmitter 6. The received data is compared by the logic unit 5 with data stored in an associated memory 11 and if found valid an electromagnetic door release 12 is actuated to permit entry.

Figure 2:
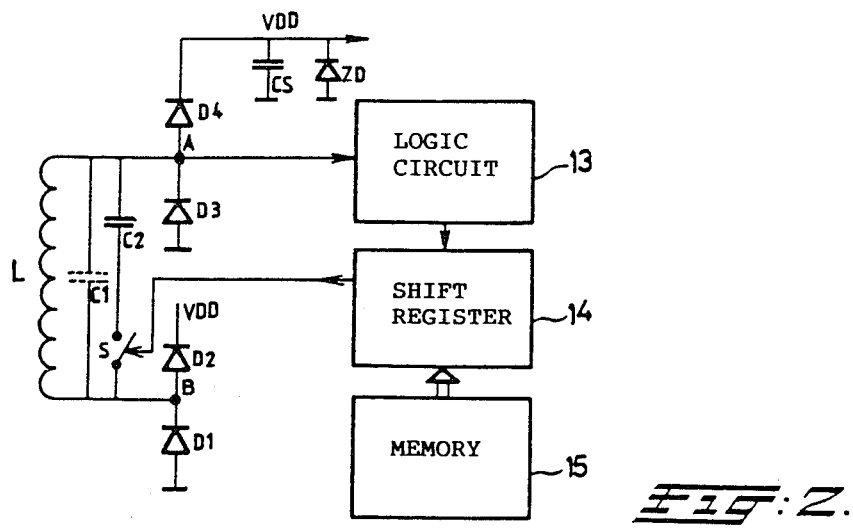
FIGS. 2-6 are schematic block diagrams of various circuits illustrating the development of a suitable transponder in accordance with the invention.

The transponder circuit 9 may operate on a principle as illustrated in FIG. 2. An antenna coil L receives the magnetic energy from the generator in the apparatus 1 and provides the circuit with power to function. Diodes D1-D4 rectify the induced voltage in L, capacitor CS buffers the supply voltage VDD, while zener diode ZD limits the maximum supply voltage. The frequency of the alternating magnetic field, suitably divided, acts as a clock for logic circuitry 13 which drives a shift register 14 containing the identification data from a memory 15. This information is transmitted by intermittent closing and opening of a solid state switch S. When S is closed the resonance frequency of the input circuitry containing capacitors C1, C2 changes. This leads to a variation of the amplitude of the magnetic field and can be detected by the receiver 10.

Problems arise, however, in integrating a circuit of this kind with capacitors C1, C2 and CS onto a single monolithic device. In general only very small capacitors, with a relatively poor tolerance on the capacitance value, can be practically integrated onto a chip because of the large surface area they require, and in the present instance the coil L also will occupy a considerable proportion of the chip area. This means that the supply decoupling will be very limited because of the small possible values of CS while the resonance frequency of the input will have a wide tolerance in the absence of any economical form of "on chip" trimming.

Figure 3:
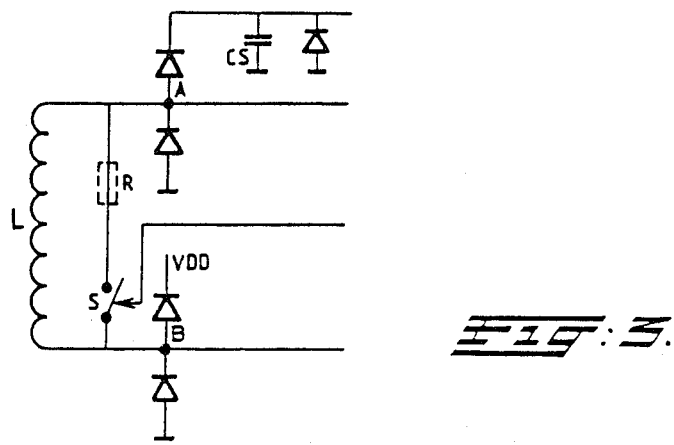

To avoid the use of C1 and C2, a non-resonating input as shown in FIG. 3 could be used. Switch S short-circuits coil L, which leads to an amplitude modulation of the magnetic field, which can be detected by the receiver 10. In addition, if the transmitter 6 consists of an oscillator of which the frequency is (partly) determined by the inductance of coil 7, modulating the magnetic field amplitude will also modulate this inductance and therefore the frequency of the magnetic field. Detection of this data within receiver 10 can therefore also by realised by using FM-detection instead of AM-detection.

Figure 4:
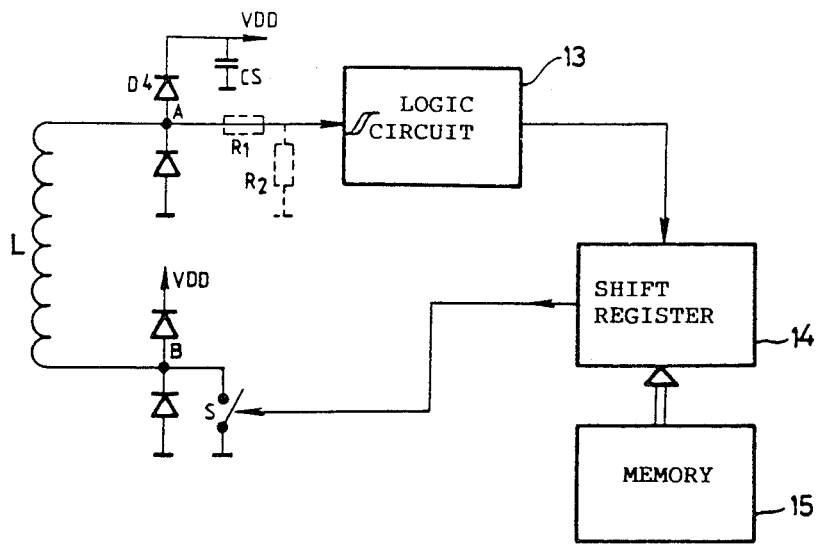

Two drawbacks occur, however, in that when S is closed the circuit will no longer be provided with power and also the clock signal will disappear. Even when a series resistance R is used, the supply voltage will still decrease significantly; otherwise, by increasing R, a significant decrease of the modulation of the magnetic field will occur. A solution to this problem is shown in FIG. 4. Switch S now short-circuits the coil only during one half of a period of the magnetic field. In this way, no significant decrease of the supply voltage occurs when S is closed. By connecting the clock input of the logic circuit with point A, the clock signal will constantly be available whether S is closed or not.

Figure 5:
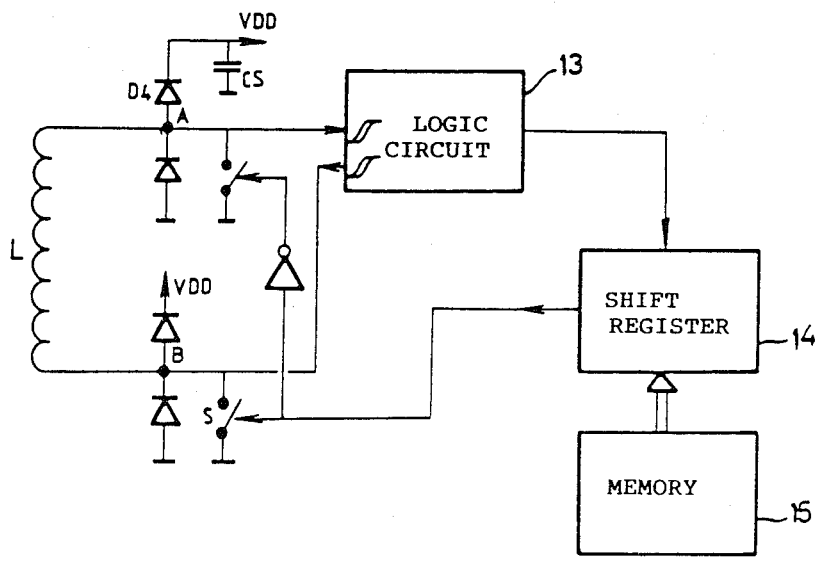

An alternative scheme for data-transmission from the responder is illustrated in FIG. 5 where the coil L is short-circuited during the first half period of the magnetic field or during the second half period of the magnetic field, dependant on the logic state of the output. In this way a magnetic field with the same frequency as the output signal is added to the existing magnetic field instead of modulating this field, so that the AM- (or FM-) demodulator situated in the receiver 10 can be replaced by a high-cut filter.

The power supply capacitor CS can be kept small by using a high supply frequency—say 10 MHz—and by keeping the power consumption low. The static power consumption can be very low if the circuit is realised in a CMOS technology, but at high frequencies (like the used input clock frequency) the power consumption of CMOS becomes considerable. This considerable power consumption is due to the transitions of the logic levels inside the circuit, so if it is arranged that transitions only occur on the positive going edge of the input clock, the power during the transitions can directly be derived from L instead of the supply capacitor CS. During the transitions the supply current will first be obtained from CS, but because CS is small, the supply voltage VDD will decrease rapidly, until VDD is equal to the momentary voltage on A minus the forward voltage drop of D4. From that moment L will provide the circuit with supply voltage and current during a large part of the positive period of the voltage on A. A voltage divider R1, R2 might be used (as indicated in FIG. 4) to provide a higher voltage on A at the moment the clock input is 'triggered' and multiple transitions inside the circuit occur.

A schmitt-trigger clock input will also enhance reliable operation.

Figure 6:
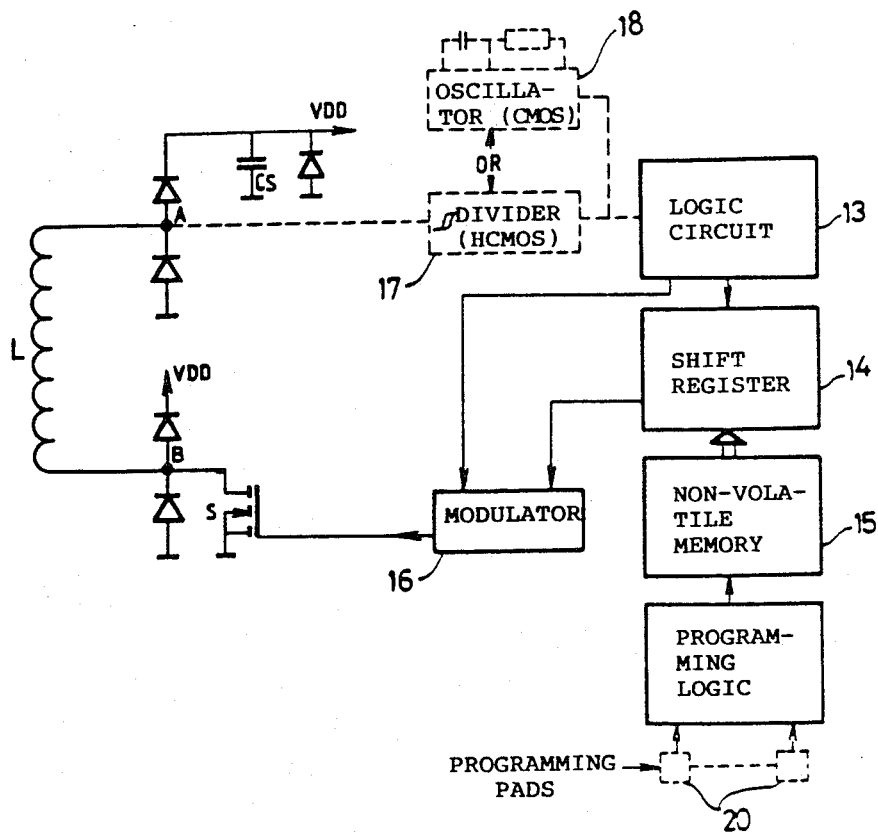

A further improvement which makes detection of the transmitted data easier is the use of a modulator such as indicated at 16 in FIG. 6. To explain, when token 2 is detected by detector 4, fast retrieval of the identification data is desirable for reasons of fast door release and minimising power consumption. When the transmitter 6 is switched on a lot of low frequency components with a large amplitude occur for a while in the received signal. This makes easy and reliable detection impossible for some time directly after switching on the transmitter. To minimise this time delay a low-cut filter should be used with a cut-off frequency as high as possible, but not higher than the lowest frequency components of the signal transmitted by the responder. Therefore the lowest frequency components of the transmitted signal should be as high as possible. If the data output of shift register 14 is applied directly to S, as indicated in FIGS. 4 and 5, it will happen that S is closed or opened for a long period if the data contains a succession of one's (or zero's next to each other. Therefore the transmitted data will contain low frequency components, which restrict the cut-off frequency of the low-cut filter inside the receiver 10. If instead the data is modulated onto a subcarrier (using a phase or frequency modulation principle), and this modulated subcarrier is used to switch S, the difference between the maximum and minimum time that S is closed or opened can be highly reduced. Thus, by using the modulator 16 the lowest frequency components contained by the transmitted signal can become more than an order of magnitude higher; therefore the cut-off frequency of the low-cut filter inside the receiver 10 can be chosen an order of magnitude higher which leads to a much faster and reliable detection of the transmitted data.

For reasons of power consumption of the transponder, VDD must be as low as possible. This makes it desirable that the input clock divider and therefore the whole final circuit is realised in a high speed CMOS technology. If for other reasons, standard CMOS would be highly preferred, an alternative circuit is possible with an on chip oscillator. Both alternatives are indicated at 17 and 18 respectively in FIG. 6.

Figure 7:
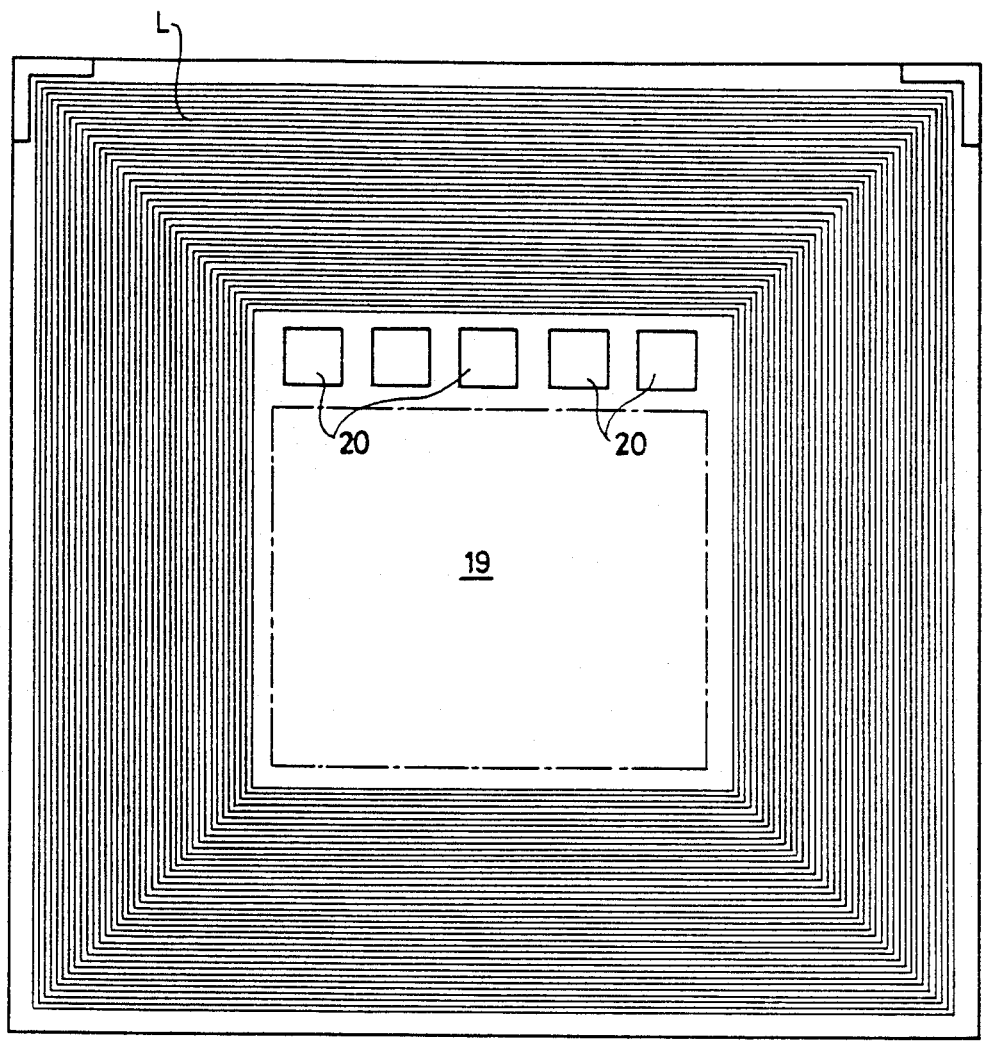
FIG. 7 illustrates schematically an example of the implementation of transponder as an integrated circuit.

Turning to FIG. 7, this indicates one possible implementation of the entire transponder circuit 9 on a chip which may measure approximately 4×4 mm. The active components of the circuit are provided in the central area 19 surrounded by the turns of the antenna coil L. Contact pads for use in programming the identification data into the memory 15 are indicated at 20. If, however, programming can be achieved by a contactless method, making use of the coil L to provide the circuit with sufficient power and to transfer the data to be programmed, area 20 can be used for the corresponding programming logic.

The transponder circuit 9 is schematically illustrated in FIG. 1 as mounted in the shank of a token 2 shaped to resemble a conventional key and this represents a convenient implementation of a personal identification device. In principle, however, the structure of the substrate by which the transponder is carried is open to considerable variation—and could for example be in the form of a card—so long as the token and receiving apparatus are appropriately mutually configured to place the transponder correctly in relation to the field generator when used.

Figure 8A:
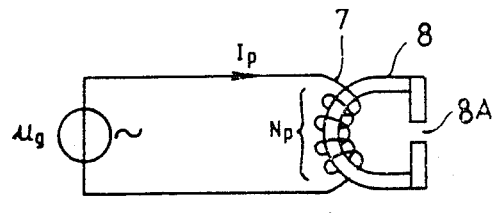
FIGS. 8A-8D include several schematic block diagrams illustrating the development of a suitable transmitter for use in the system.
Figure 8B:
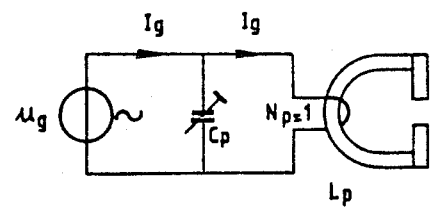

A transmitter 6 configuration which would normally be applied is shown in FIG. 8A. The magnetic field-strength inside the airgap 8A is to a first approximation a linear function of the current Ip multiplied by the number of primary windings Np. Because the system is battery operated, the total supply voltage and current are limited, while the power dissipation must be kept to a minimum. This has led to the following considerations:

(1) The number of windings of the coil L on the transponder chip is restricted and must be kept to a minimum for reasons of minimising chip area and series resistance of the coil. On the other hand the total induced (secondary) voltage in the coil on the chip must be maximised. Because the secondary voltage is inversely proportional to the primary number of windings Np, Np should be minimised. The smallest practical value of Np is one (FIG. 8B).

(2) When Np is chosen to be one, the inductance and therefore the impedance of the primary coil is very low and Ip and the power to be delivered by the battery becomes excessive, which is not allowable. A solution is found by using a high frequency (say 10 MHz) and by tuning the inductance of the primary coil using a capacitor Cp (FIG. 8B). Although Ip does not change, the current Ig to be delivered by the generator and therefore also the current and energy to be delivered by the battery is decreased by an order of magnitude.

Figure 8C:
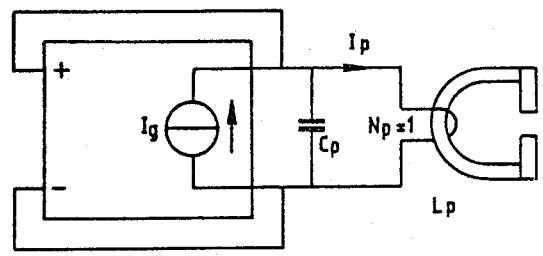

(3) To obtain the stated severe decrease of the generator current Cp must be tuned, which is undesirable during mass production. A solution is to make the tuned network LpCp the frequency determining part of a generator, formed by LpCp and a transconductance amplifier (FIG. 8C). In this way the frequency is automatically tuned to LpCp.

Figure 8D:
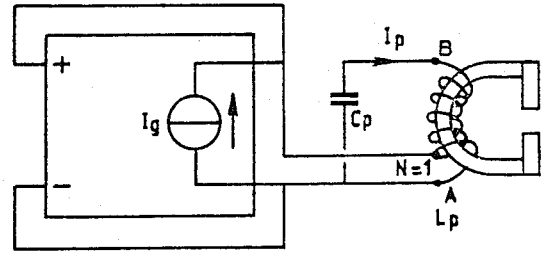

(4) Because the excessive current Ip still flows through the capacitor Cp, this capacitor must be a high quality, low loss and therefore an expensive and large device. A solution to this problem is shown in FIG. 8D, where the primary coil is divided into two parts. The inductance seen between point A and B is highly increased which leads to a much lower value for Cp and Ip. Therefore Cp can become a standard type capacitor.

I claim:

1. An identification system, consisting of at least one first or stationary element and at least one movable or second element or token, said first element comprising a first induction coil adapted to generate a locally restricted magnetic alternating field, said coil being connected to a source of alternating and in particular hf current, and also being connected to means for detecting variations of said electromagnetic field, said detecting means being connected to signal processing means adapted to compare the detected field variations with a plurality of standard signal patterns, and to produce an output signal in the case of correspondence with one of said patterns, said second element comprising a second induction coil adapted to pick up the field of said first coil when placed in the field of said first coil, said coil being connected to a rectifier circuit adapted to rectify the induction voltage of said second coil, a capacitive storage means being provided for smoothing the rectified voltage, further comprising a control circuit fed by the rectified voltage from said rectifier circuit and receiving, at an input terminal, the ac voltage induced in said second coil, said control circuit comprising encoding means adapted to produce, at an output terminal, code signals identifying said second element, said code signals being used for actuating a switch means which, in one condition, short-circuits said second coil, characterised in that said capacitive means is a small capacity, in particular an integrated or intrinsic capacity of the circuit means of said or each second element, in that said rectifier means is a full-wave rectifier bridge with four arms, two opposite corners thereof being connected to the respective ends of said second coil, one thereof also being connected to the signal input terminal of said control circuit, and the other two corner points forming the supply and ground terminals respectively of said rectifier bridge, and in that said switch means is adapted to short-circuit one arm of said bridge which is connected to that end of said second coil which is not connected to the signal input terminal of said control circuit.

2. The system of claim 1, characterised in that, in said or each second element a second switch means actuated by said control circuit is provided which is adapted to short-circuit the opposite arm of said rectifier bridge, said second switch means being controlled by said output code signals in phase opposition in respect of said first switch, the corner point of said rectifier bridge connected to said first switch means being connected to a second input terminal of said control circuit.

3. The system of claim 1, characterised in that the or each input terminal of said control circuit is connected to a Schmitt trigger for providing shaped pulses derived from the induced voltage to be used as clock pulses for controlling the encoding means.

4. The system of any one of claims 1, characterised in that said control circuit is provided with a frequency divider, adapted to produce clock pulses having a lower frequency than the hf voltage induced in said second coil.

5. The system of any one of claims 1, characterised in that the code signal output of said control circuit is connected to a modulator which is connected to the control terminal of said switch means.

6. The system of any one of claims 1, characterised in that said control circuit comprises an oscillator for generating a clock frequency signal and in that said or each first element comprises synchronising means for synchronising the signal processing means with clock pulses derived from the field variations detected by said first coil.

7. The system of any one of claims 1, characterised in that said second coil is an integrated part of integrated circuits of said second element or token.

8. The system of any one of claims 1, characterised in that said first coil is a frequency determining part of an oscillator forming the source of alternating current, and in that said coil consists of a small number of turns, and in particular of one single turn.

9. The system of claim 8, characterised in that said coil having a small number of turns is inductively coupled with an auxiliary coil having a larger number of turns than said first coil, and being connected to a capacitor forming the other frequency determining element of said oscillator.

* * * * *